United States Patent Office 3,399,146
Patented Aug. 27, 1968

---

3,399,146
SUBSTITUTED TRISULFONYLMETHANES IN A METHOD OF MODIFYING SURFACE PROPERTIES OF LIQUIDS AND SOLIDS
Clyde Stephen Scanley, Stamford, Conn., assignor to American Cyanamid Company, Stamford, Conn., a corporation of Maine
No Drawing. Application Dec. 21, 1964, Ser. No. 420,097, which is a continuation-in-part of abandoned application Ser. No. 324,184, Nov. 18, 1963. Divided and this application Aug. 31, 1965, Ser. No. 484,114
12 Claims. (Cl. 252—355)

ABSTRACT OF THE DISCLOSURE

This invention relates to a method of modifying the surface properties of liquids or solids such as metals by contacting said surface with substituted trisulfonylmethanes of the formula:

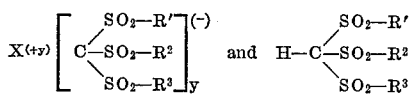 and 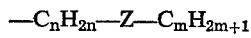

wherein X represents a cation selected from the group consisting of hydrogen, metal, amino and ammonium cations; R' represents the functional group $$-C_nH_{2n}-Z-C_mH_{2m+1}$$

with Z equal to a radical selected from the group consisting of methylene, phenylene, naphthylene, cyclohexylene, and oxy, with the provision that each of $n$ and $m$ must be a whole integer from 4 to 21; and $R^2$ and $R^3$ each represent a substituent selected from the group consisting of lower alkyl, phenyl, tolyl, cyclohexyl, and R'; and $y$ is a whole integer from 1 to 4 provided that when each of R', $R^2$, and $R^3$ is a lower alkyl that at least one lower alkyl chain includes at least five carbon atoms.

---

This application is a division of application Ser. No. 420,097, filed Dec. 21, 1964, now abandoned, which is a continuation-in-part of application Ser. No. 324,184, filed Nov. 18, 1963, now abandoned, which is a continuation-in-part of Ser. No. 172,818, filed Feb. 12, 1962, now abandoned.

This invention relates to new and useful substituted trisulfonylmethanes, process for their manufacture and methods of their use. The invention is more particularly concerned with the discovery of a new and unexpectedly beneficial class of substituted derivatives of trisulfonylmethane which exhibits excellent properties of reducing surface tension and modifying the inter-facial characteristics of various liquids and solids. The manifestation of these properties will, of course, be seen in their utilization as surfactants, emulsifiers, wetting agents, dispersants anticorrosives and the like in a number of industrial and laboratory uses.

It is a principal object of the present invention, therefore, to provide the art with a new and useful class of substituted trisulfonylmethanes and a method for their preparation.

It is a further object to provide a new method of modifying the surface properties of liquids and solids by adding thereto a novel substituted trisulfonylmethane.

These and other more specific objects of the present invention will become apparent as the description of the invention is further detailed.

The novel compounds of the present invention may be generally depicted as substituted trisulfonylmethanes of the general structure:

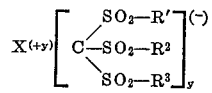

or, where X is hydrogen, of the general structure:

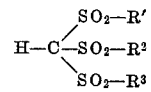

wherein X represents a cation selected from the group consisting of hydrogen, metal, amino, and ammonium cations; $R_1$ represents the functional group $$-C_nH_{2n}-Z-C_mH_{2m+1}$$

with Z equal to a radical selected from the group consisting of methylene ($-CH_2-$), phenylene

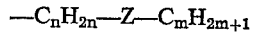

naphthylene

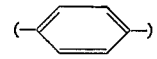

cyclohexylene

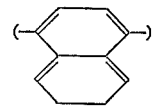

and oxy ($-O-$) with the provision that $n+m$ must be a whole integer from 4 to 21; $R_2$ and $R_3$ each represent a substituent selected from the group consisting of lower alkyl, phenyl, tolyl and cyclohexyl or, in some cases, the functional group defined for $R_1$ above; and $y$ is a whole integer from 1 to 4. A compound where such substitution occurs would thus have all three, $R^1$, $R^2$ and $R^3$, representing the functional group $$-C_nH_{2n}-Z-C_mH_{2m+1}$$

In a compound wherein one or all of the R's are alkyl in accord with the formula $-C_nH_{2n}-Z-C_mH_{2m+1}$ where Z is methylene, the alkyl groups involved may be either normal or branched chain structures and would embrace such members as pentyl, hexyl, heptyl, octyl, nonyl, decyl, undecyl, dodecyl, tridecyl, pentadecyl, hexadecyl, octadecyl and the like, to cite a few members. Where alkyl group substitution is involved it should be understood that the substitution may be of similar alkyl groups, e.g., $R^1$, $R^2$ and $R^3$ may each represent a dodecyl group, or mixed, e.g., $R^1$ may represent a hexyl group, $R^2$ may represent an octyl group and $R^3$ may represent a dodecyl group (including normal and branched chain structures).

The compounds of the present invention thus include substituted trisulfonylmethanes and their metal, amino and ammonium salts. The metal salts of such substituted trisulfonylmethanes include those of the alkali metals (for example, sodium, potassium and lithium), the alkaline earth metals (for example, magnesium, calcium and barium), the iron group metals (that is, iron, cobalt and nickel), the palladium group metals (that is, ruthenium, rhodium and palladium), the platinum group metals (that is, osmium, iridium and platinum), the metals of subgroup I–B of the Periodic Chart (that is, copper, silver and gold), the metals of subgroup II–B (that is, zinc, cadmium and mercury), certain metals of subgroup IV–B (for example, tin and lead), certain metals of subgroup V–B (for example, antimony and bismuth), and aluminum. From the structural formula appearing hereinbefore and the values for $y$, it will be thus observed that monovalent, divalent, trivalent and tetravalent metals may all be employed in the preparation of such salts. In many instances, the alkali metal salts of the substituted trisulfonylmethanes are preferred for maximum solubility in water, and in these cases sodium, potassium and lithium salts are preferred. In still other cases the alkaline earth metal salts such as those of magnesium, calcium and barium are preferred particularly where the compounds are to be employed in oil, or water/oil or oil/water emulsions or in oleaginous mediums. The aforementioned metal salts are conveniently prepared by reacting the hydroxides of said metals with a substituted trisulfonylmethane (where X in the above formula is hydrogen) or as hereinafter described.

Other salts of the substituted trisulfonylmethanes include neutralization reaction products of the substituted trisulfonylmethanes with ammonium hydroxide and amines.

The salt-forming amines include alkyl amines such as methylamine, ethylamine, dimethylamine, trimethylamine, triethylamine, triisopropylamine, triisobutylamine, cyclohexylamine and the like; hydroxy amines such as monoethanolamine, diethanolamine, triethanolamine, monoisopropanolamine, diisopropanolamine, triisopropanolamine, and the like; heterocylic amines such as morpholine, pyridine, piperidine, and the like; aromatic amines such as aniline, and the like; and quaternary ammonium hydroxides such as tetramethylammonium hydroxide, tetraethylammonium hydroxide, trimethylhydroxyethylammonium hydroxide, tetrahydroxyethylammonium hydroxide, benzyltrimethylammonium hydroxide and the like.

The term "amino" in the definition of the cation X is used herein to mean the cation formed from any of the foregoing amines. The precise chemical structure of the cation will, of course, depend on the character of the basic reactant chosen to form a salt by neutralization with a substituted trisulfonylmethane depicted as (III) below. For example, when a primary, secondary or teritary amine is the base, "amino" more particularly means an alkyl ammonium cation; when a quaternary ammonium hydroxide is the reactant, "amino" defines a quaternary ammonium cation. When a hydroxy amine is the base, "amino" is a hydroxy quaternary ammonium cation or a hydroxy alkyl ammonium cation.

In any event, a critical moiety of the molecule with respect to surface activity appears to be in the constitution of the functional groups indicated by $R^1$, $R^2$, and $R^3$. Thus, the lower alkyl substituted trisulfonylmethanes wherein $R^1$, $R^2$, and $R^3$ are methyl, ethyl, propyl or butyl have been reported in the literature by Evald Samen in Arkiv. Kemi, Mineral. Geol. 12B, No. 51 (1938), 14B, No. 28 (1941), 15B, No. 15 (1942) and 24B, No. 6 (1947). However, such compounds have never demonstrated any significant surface active properties or ability to modify surface tension. In fact, when tested these compounds will be found to be devoid of any such activity. Quite unexpectedly, however, when one prepares the hitherto unknown substituted derivaties of trisulfonylmethane as defined herein, this series of compounds is found to be possessed of quite excellent surfactant properties.

The compounds of the present invention can, in general, be prepared by the general reaction:

(1) 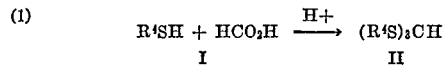

(2) 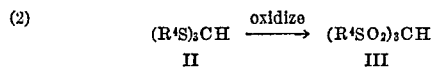

In the above reaction, a suitable substituted mercaptan (I) where $R^4$ has any of the values specified for $R^1$, $R^2$, or $R^3$, as defined above is reacted with formic acid as illustrated or a lower alkyl ester thereof to form the corresponding substituted trithioorthoformate (II). The reaction is conducted in the presence of anyhydrous HCl.

The substituted trithioorthoformate (II) dissolved in a suitable inert solvent such as chloroform is treated with a 100 percent excess of peracetic acid at a temperature of −20 to −30° C. with constant agitation of the reaction mixture while the peracetic acid is being added. After a half hour the reaction mixture is allowed to warm to room temperature and then permitted to stand overnight. The product is recovered in a pure state by conventional techniques such as by treating with additional chloroform and extracting with water. The solvent is evaporated off and the product recrystallized from a suitable solvent such as, for example, ethyl alcohol.

Although chloroform is the preferred solvent for the reaction, any of a number of equally useful inert halohydrocarbon solvents such as dichloroethane, methylene chloride, and the like, may be employed.

The time of oxidation will vary with the temperature conditions and solvent being employed, but generally the reaction will have run to completion within two to four hours for most, if not all, of the reactants employed.

In those cases where the salt of the final compound is to be prepared, equivalent quantities of a suitable base such as the metal hydroxides (e.g., sodium hydroxide, potassium hydroxide, calcium hydroxide), ammonium hydroxide or amines are added to an aqueous slurry or an organic solution of the substituted trisulfonylmethane so as to obtain the salt. For the preparation of certain metal salts such as, for example, aluminum, an alkali metal salt of a substituted trisulfonylmethane may be reacted with a metal halide to obtain the desired salt. In still other cases a metal oxide such as, for example, zinc oxide, may be reacted with a substituted trisulfonylmethane, in solution or in a slurry, to yield the desired metal salt.

As already mentioned, it has been found that when the novel trisulfonylmethanes such as, for example, sodium tris[hexylsulfonyl]methane, are added to water the surface tension of the solution is drastically reduced as will be more particularly pointed out in the examples which follow. The novel trisulfonylmethanes may be directly admixed with the solution they are sought to modify or, alternatively, they may be painted, dipped, or sprayed on the surface of solid objects whose surface properties it is desired to modify.

While it is preferred to employ the novel trisulfonylmethanes singly they may, in a given instance, be admixed with other ingredients, such as diluents, carriers and the like. If desired, they may be combined in a formulation with other well known anionic, cationic, or nonionic emulsifiers.

The invention will be further illustrated by the following examples of specific methods of preparation of some of the representative members of the series. Also a brief comparison of the unexpectedly high surface activity of representative members of the series will be shown as compared to the lower alkyl substituted members which have no such activity and are not embraced within the present invention. This comparison of relative activity will further demonstrate the truly unexpected nature of applicant's discovery.

In several examples presented, it must be considered that their purpose is merely to illustrate the invention in more concrete terms and any specific enumeration of detail contained therein should not be interpreted as a limitation on the case except as indicated in the appended claims.

Example 1.—Tris-[n-hexylsulfonyl]methane (A) A solution of 0.432 mole (32 grams) of ethyl formate and 1.52 mole (180 grams) n-hexyl mercaptan is saturated with anhydrous HCl at 0° C. The solution is resaturated twice more over a two-day period. The organic layer is separated and washed with water, sodium carbonate solution and water again and dried over calcium chloride. Excess hexyl mercaptan is distilled off from the hexyl trithioorthoformate formed, down to a pressure of 0.25 mm. of mercury at 170° C. The final yield of product is 92.5 percent or 145.3 grams of hexyl trithioorthoformate which exhibits a slight yellow coloring.

(B) Hexyl trithioorthoformate, 0.169 mole (61.6 grams)), from above is dissolved in 300 ml. of chloroform and the solution stirred at −20 to −30° C. A 100 percent excess of peracetic acid (303 grams of 50 percent acid solution) is added steadily to the chloroform solution over a 25 minute period with vigorous stirring while the temperature is controlled at −20 to −30° C. by means of an acetone-Dry Ice bath. The reaction mixture is then allowed to warm to room temperature and is held at this temperature for two to three hours. The mixture is then allowed to stand overnight.

Additional chloroform is added to the mixture which is then extracted six times with an equal volume of water. The first water extract is back extracted with chloroform and this extract is then combined with the main chloroform layer. The remainder of the chloroform is boiled off and the product crystallized from ethanol, filtered and washed with ethanol. A first crystalline crop of 64.4 grams of tris-[n-hexylsulfonyl]methane is obtained having a M.P. of 169.0–170.3° C. and constituting an 89 percent yield.

The compound thus obtained exhibits strong infra-red bands at 1150, 1320 and 1340 cm.$^{-1}$ and a medium strength band at 1130 cm.$^{-1}$ and weaker bands at 780, 1110 and 1510 cm.$^{-1}$.

Examples 2–7

The procedure of Example 1 is repeated in all essential respects except that the desired properly substituted mercaptan is substituted for the n-hexyl mercaptan employed in that example. The following tris-[alkylsulfonyl]methanes, the salts of which demonstrate activity as modifiers of surface tension, are recovered. The properties of these compounds are outlined in the following table.

TABLE I

| Example | Alkyl substitution | Molecular weight of compound | Melting point of compound, °C. |
|---|---|---|---|
| 2 | Iso-amyl | 419 | [1] 273–275 |
| 3 | n-Amyl | 419 | 207–208 |
| 4 | n-Heptyl | 503 | 168.5–171 |
| 5 | n-Dodecyl | 712 | 132–133 |
| 6 | n-Octadecyl | 966 | 110.5–114 |
| 7 | n-Hexyloxyethyl | 593 | [1] 97 |

[1] Decomp.

These tris-[alkylsulfonyl]methanes are also noted to exhibit strong infra-red absorption spectral characteristics similar to those described for tris-[n-hexylsulfonyl]methane.

Example 8.—Sodium salt of tris-[n-hexylsulfonyl]methane

The procedure outlined for the preparation of the free acid in Example 1 is repeated. The product obtained therein is reacted with an equivalent amount of aqueous sodium hydroxide and the salt is then recovered.

Example 9.—Bis-[methylsulfonyl]-[octadecylsulfonyl]methane (A) A mixture of formalin and methyl mercaptan is saturated with anhydrous hydrochloric acid. On standing at room temperature overnight an organic phase separates from the aqueous acid phase. The organic phase is distilled to obtain dimethyldiethioformal, B.P. 148–152° C.

(B) A solution of the product of Part A in chloroform is treated at −20° C. with a 100 percent molar excess of a 50 percent peracetic acid solution to obtain bis-[methylsulfonyl]methane, M.P. 143–144° C.

(C) An aliquot of the product of Part B of this example in acetone is treated with an equimolar amount of sodium ethoxide and methyl octadecylthiosulfonate to obtain bis-[methylsulfonyl]-[octadecylsulfonyl]methane.

(D) An equivalent quantity of the bis-[methylsulfonyl]-[octadecylsulfonyl]methane of Part C is reacted with sodium hydroxide to obtain the sodium salt thereof.

Example 10.—Bis-[phenylsulfonyl]-[docecylsulfonyl]methane (A) The procedure set forth in Part A of Example 9 is repeated in all essential respects except that thiophenol is substituted for methyl mercaptan utilized therein. Bis-[phenylsulfonyl]methane is obtained.

(B) The product of Part A of this example is treated with an equivalent quantity of methyldodecylthiosulfonate and sodium ethoxide to obtain bis-[phenylsulfonyl]-[dodecylsulfonyl]methane.

Example 11.—Bis-[hexylsulfonyl]-[dodecylsulfonyl]methane

The procedure of Example 10 is repeated in all essential respects except that an equivalent amount of n-hexyl mercaptan is substituted for thiophenol utilized in Part A. Bis-[hexylsulfonyl]-[dodecylsulfonyl]methane is obtained.

Example 12.—Bis-[methylsulfonyl]-[docosanylsulfonyl]methane

The procedure of Example 9 is repeated in all essential respects except that methyl docosanylthiosulfonate is substituted for methyl octadecylthiosulfonate utilized in Part C. Bis-[methylsulfonyl]-[docosanylsulfonyl]methane is obtained.

Example 13.—Preparation of amino salt of tris-(n-heptylsulfonyl)methane

A solution of 0.10 mol (50.3 grams) of tris-(n-heptylsulfonyl)methane (prepared as above) in 500 ml. of chloroform is neutralized by adding to it, slowly with stirring, 0.10 mol (10.1 grams) of triethylamine. The solution is chilled to −10° C. and the crystalline triethyl ammonium salt is recovered by filtration.

The numerous applications in which the novel substituted trisulfonylmethanes of this invention are found to have utility are described below.

EMULSIFICATION AND WETTING

Sodium tris-[heptylsulfonyl]methane is compared with sodium di-2-ethylhexyl sulfosuccinate with respect to emulsification and wetting ability. The concentration of sodium tris-[heptylsulfonyl]methane employed is 0.21 percent in water while the concentration of sodium di-2-ethylhexyl sulfosuccinate employed is 0.24 percent in water. The tests and results thereof are as follows:

(a) EMULSIFICATION

One volume of aqueous solution of surface active agent and 1.3 volumes of white mineral oil are vigorously stirred for two minutes and then allowed to stand. The sodium tris-[heptylsulfonyl]methane emulsion is whiter than the sodium di-2-ethylhexyl sulfosuccinate emulsion indicating a smaller particle size for the sodium tris-[heptylsulfonyl]methane emulsion (more complete emulsification).

Within 30 seconds there is evidence of some aqueous phase separation from the sodium di-2-ethylhexyl sulfosuccinate emulsion. There is no aqueous separation from the sodium tris-[heptylsulfonyl]methane emulsion for three minutes. On standing overnight the aqueous separation from the sodium tris-[heptylsulfonyl]methane emulsion is only 50 percent of that from the sodium di-2-ethylhexyl sulfosuccinate emulsion.

(b) WETTING

Drops of sodium tris-[heptylsulfonyl]methane and sodium di-2-ethylhexyl sulfosuccinate solutions (0.21 and 0.24 percent, respectively) are placed on a freshly scraped paraffin surface. The contact angle (measured in the aqueous phase) for the sodium di-2-ethylhexyl sulfosuccinate solution is 35° whereas the angle for the sodium tris-[heptylsulfonyl]methane solution is 5°. This indicates very superior wetting properties for sodium tris-[heptylsulfonyl]methane as compared with sodium di-2-ethylhexyl sulfosuccinate, a commercial wetting agent.

CREATION OF HYDROPHOBIC SURFACE

A 0.21 percent solution of sodium tris-[heptylsulfonyl]methane is spread on a glass surface and wiped off with a dry cloth. The glass surface is then chilled and exposed to water vapor. The water vapor condenses as discrete droplets which run off the surface. This illustrates that substituted trisulfonylmethanes have utility as water-repellent agents.

GREASES AND THICKENERS

A 3 percent solution of sodium tris-[dodecylsulfonyl]methane is made up by dissolving tris-[dodecylsulfonyl]methane in an S.A.E. 20 lubricating oil base and then neutralizing by adding 10% aqueous sodium hydroxide to the well-stirred oil solution at 150° C. The cooled product was a thick grease.

SOLUBILIZATION OF ORGANICS IN WATER

The following experiments illustrate the ability of sodium tris-[hexylsulfonyl]methane to solubilize benzene in water.

Additive: Percent of benzene that could be added to water before turbidity appeared (25° C.)
None _____ 0.08
1.2% sodium tris-[n-hexylsulfonyl]methane __ 0.32
1.7% sodium tris-[n-hexylsulfonyl]methane __ 0.45

DETERGENTS

Tergetomer tests on standard soiled cloths (Test Fabrics E.M.P.A. Soiled Cloth) were run on the following materials at 1% in water.

Detergent: Reflectance
Sodium tris-[n-amylsulfonyl]methane _____ 60
Sodium tris-[n-hexylsulfonyl]methane _____ 60
Sodium tris-[n-heptylsulfonyl]methane _____ 80
Unwashed cloth _____ 10
Unsoiled cloth—Reflectance taken as 100.

FOAMERS

Sodium tris-[n-heptylsulfonyl]methane and sodium di-2-ethylhexyl sulfosuccinate were compared as foaming agents by aerating 0.002% solutions of each. At this low concentration sodium di-2-ethylhexyl sulfosuccinate was not able to produce any stable foam layer on the surface of the water. The trisulfonylmethane salt solution, however, filled the aeration column with foam and carried 5% of the water out of the column in the form of foam.

PAPER SIZING AGENTS

Sodium tris-[n-dodecylsulfonyl]methane was used to replace rosin soap in a standard paper sizing procedure using alum as the size anchoring agent. Sizing efficiency as indicated by water penetration was 20% better than that produced by the rosin soap.

WATERPROOFING

Cotton cloth was dipped in an aqueous 1% solution of $AlCl_3 \cdot 6H_2O$, wrung out, dipped in a 0.1% solution of sodium tris-[n-heptylsulfonyl]methane, wrung out and dried.

This treated cloth was not wetted by water droplets whereas untreated cloth absorbed water droplets readily.

The observed surfactant properties of the substituted trisulfonylmethanes and their salts point to utility in certain additional areas as follows:

Their strong absorption and ability to create a hydrophobic surface on glass suggest (1) that they should be useful in promoting dropwise condensation in steam systems (boilers, evaporators, etc.), (2) that incorporated in gasoline they should be useful in preventing accumulation of ice in carburetors of gasoline engines, (3) that they should be useful mold release agents in the forming of rubber, plastics, ceramics, etc., and (4) that they should be useful in lubricating fluids to provide lubricity for moving parts. For example, in automotive oils and greases.

Their ability to form closely packed films which is demonstrated in their creation of extremely low surface tensions suggests that they should be useful in creating monolayers to retard the evaporation of water. This would be particularly true of the hexadecyl and octadecyl species.

Their ability to form stable films also suggests that they should be useful dispersants, for example, for solids in automotive crankcase oils.

Examples 14–21

Table II below lists other representatives substituted trisulfonylmethane compounds of the invention. These compounds, or their metal, amino and ammonium salts, are prepared in substantially the same manner as set forth in Examples 1–13 and exhibit substantially the same utility as described immediately above.

TABLE II

| Example | Substituted Trisulfonylmethane |
| --- | --- |
| 14 | Tris[4-cyclohexylbutylsulfonyl]methane. |
| 15 | Tris[6-phenylhexylsulfonyl]methane. |
| 16 | Tris[6,p-tolyhexylsulfonyl]methane. |
| 17 | Tris[6,α-napthylhexylsulfonyl]methane. |
| 18 | Bis[n-butylsulfonyl]-[4-p-heptylcyclohexylbutyl-sulfonyl]methane. |
| 19 | Bis[n-butylsulfonyl]-[p-dodecylbenzylsulfonyl]-methane. |
| 20 | Bis[p-tolylsulfonyl]-[dodecylsulfonly]methane. |
| 21 | Bis[cyclohexylsulfonyl]-[octylsulfonyl]methane. |

I claim:

1. A method of modifying the surface properties of liquids and solids which comprises adding thereto a minor but effective amount of a surface-active agent comprising a substituted trisulfonylmethane selected from the group consisting of compounds of the formula:

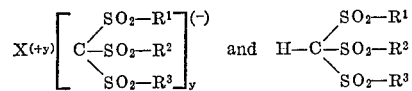 and 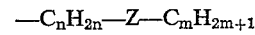

wherein X represents a cation selected from the group consisting of hydrogen, metal, amino, and ammonium cations; $R^1$ represents the functional group $$-C_nH_{2n}-Z-C_mH_{2m+1}$$

with Z equal to a radical selected from the group consisting of methylene, phenylene, naphthylene, cyclohexylene, and oxy, with the provision that each of $n$ and $m$ must be a whole integer from 4 to 21, $R^2$ and $R^3$ each represent a substituent selected from the group consisting of lower alkyl, phenyl, tolyl, cyclohexyl, and $R^1$; and $y$ is a whole integer from 1 to 4 provided that when each of $R^1$, $R^2$, and $R^3$ is a lower alkyl that at least one lower alkyl chain includes at least five carbon atoms.

2. The method of claim 1 wherein the substituted trisulfonylmethane is tris-[n-amylsulfonyl]methane.

3. The method of claim 1 wherein the substituted trisulfonylmethane is tris-[isoamylsulfonyl]methane.

4. The method of claim 1 wherein the substituted trisulfonylmethane is tris-[n-hexylsulfonyl]methane.

5. The method of claim 1 wherein the substituted trisulfonylmethane is tris-[n-heptylsulfonyl]methane.

6. The method of claim 1 wherein the substituted trisulfonylmethane is tris - [2,4,6 - trimethylheptylsulfonyl]methane.

7. The method of claim 1 wherein the substituted trisulfonylmethane is tris-[n-dodecylsulfonyl]methane.

8. The method of claim 1 wherein the substituted trisulfonylmethane is tris-[n-octadecylsulfonyl]methane.

9. The method of claim 1 wherein the substituted trisulfonylmethane is bis-[methylsulfonyl]-[octadecylsulfonyl]methane.

10. The method of claim 1 wherein the substituted trisulfonylmethane is bis[hexasulfonyl]-[dodecylsulfonyl]methane.

11. The method of claim 1 wherein the substituted trisulfonylmethane is bis-[phenylsulfonyl]-[dodecylsulfonyl]methane.

12. The method of claim 1 wherein the substituted trisulfonylmethane is tris-[n-hexyloxyethylsulfonyl]methane.

No references cited.

MORRIS O. WOLK, *Primary Examiner.*

B. S. RICHMAN, *Assistant Examiner.*